United States Patent [19]

Collette

[11] Patent Number: 4,731,513

[45] Date of Patent: Mar. 15, 1988

[54] METHOD OF REHEATING PREFORMS FOR FORMING BLOW MOLDED HOT FILLABLE CONTAINERS

[75] Inventor: Wayne N. Collette, Merrimack, N.H.

[73] Assignee: Continental PET Technologies, Inc., Stamford, Conn.

[21] Appl. No.: 878,044

[22] Filed: Jun. 24, 1986

[51] Int. Cl.⁴ ............................................. H05B 6/60
[52] U.S. Cl. ............................ 219/10.43; 219/10.47;
   219/10.55 R; 219/10.53; 264/25; 264/26;
   264/DIG. 46; 432/11
[58] Field of Search ............... 219/10.43, 10.53, 10.47,
   219/10.71, 10.81, 10.55 R, 10.55 A, 10.55 M,
   10.41; 264/25, 26, 27, DIG. 46, DIG. 65;
   432/11

[56] References Cited

U.S. PATENT DOCUMENTS 4,079,104 3/1978 Dickson et al. ..................... 264/25
4,396,816 8/1983 Krishnakumar et al. ......... 219/10.43
4,407,651 10/1983 Beck et al. ........................... 432/11

Primary Examiner—Philip H. Leung
Attorney, Agent, or Firm—Charles E. Brown

[57] ABSTRACT

A hybrid reheating of polyester preforms which are to be stretch blown into containers wherein the reheating coupled with the controlled quick initiation of the blow stretch operation after final reheating produces a container which may be filled with a hot fill without there being any disadvantageous shrinkage of the container. The reheating is by way of a specific combination of quartz oven reheating and radio frequency reheating together with specific equilibrations of the temperature cross sectionally of the preform body. Polyester preforms may be reheated to a cross sectional center temperature ranging from 225° F. to 260° F. and stretch blow molded without undesirable surface crystallization occuring while the ability of the container to be filled with a hot filled substantially without shrinkage is increased.

20 Claims, 12 Drawing Figures

QUARTZ ONLY

RF ONLY

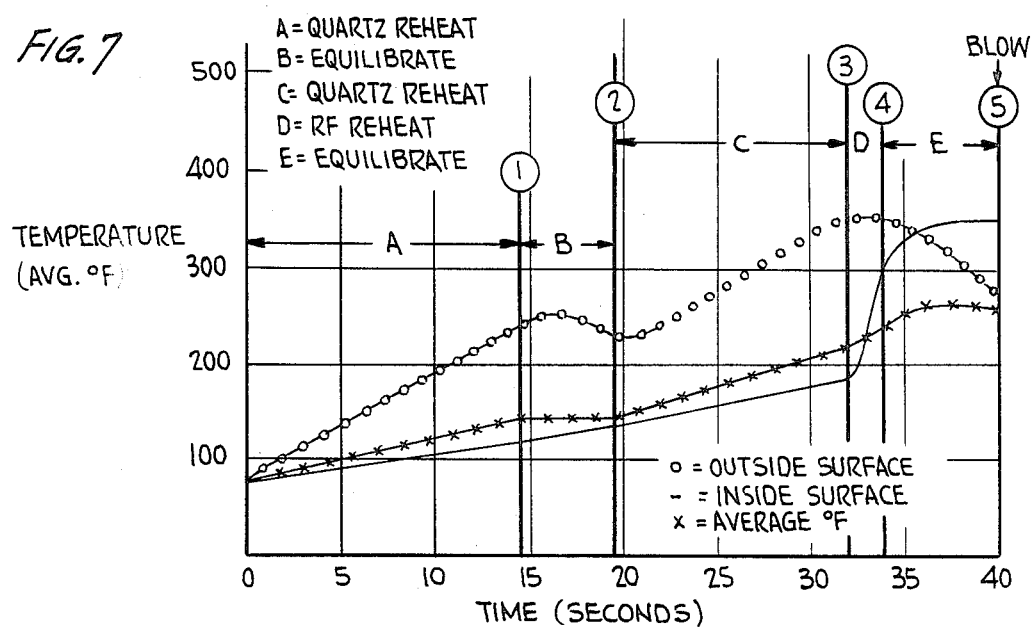
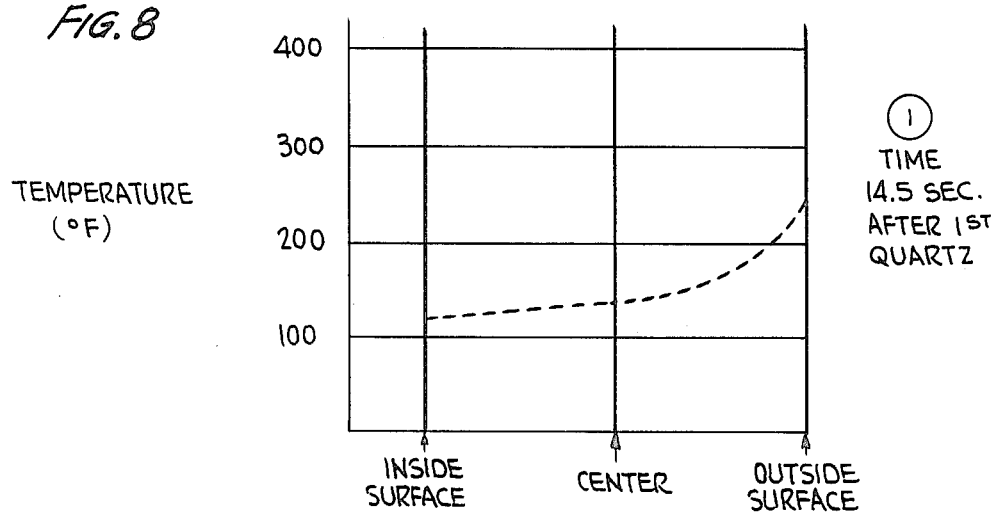
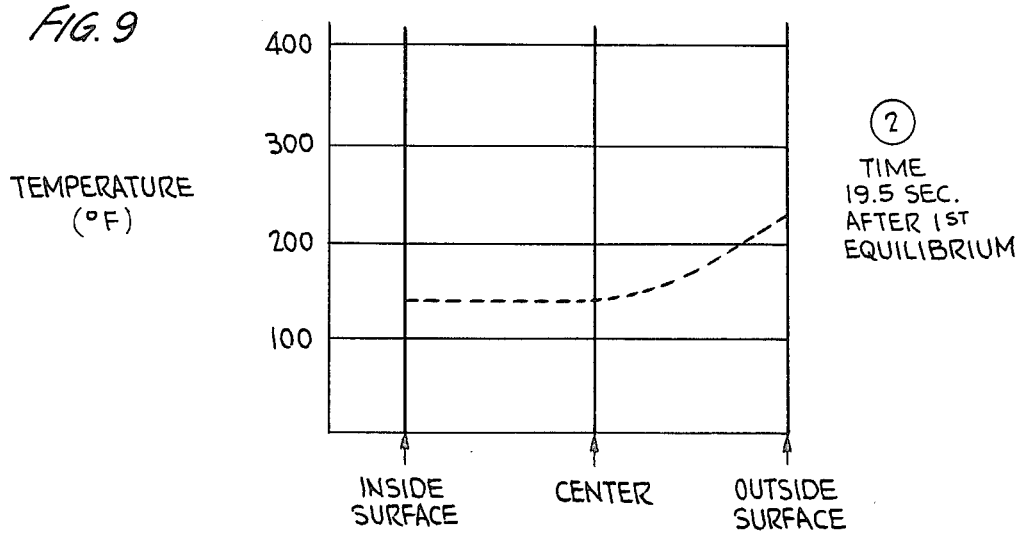

METHOD OF REHEATING PREFORMS FOR FORMING BLOW MOLDED HOT FILLABLE CONTAINERS

This invention particularly relates to the production of biaxially oriented blow molded polyethylene terephthalate (PET) containers which exhibit less than 2% volume shrinkage when filled at 190° F.

To reduce oriented PET container shrinkage when the container is exposed to temperatures above the Tg (glass transition or softening temperature), it is necessary to optimize the percentage of strain and/or thermally induced crystallinity in the blown container sidewall (i. e., keeping the oriented, non-crystalline portion of the container to a minimum).

Typical heat set techniques now being practiced concentrate on thermally inducing crystallinity in the container wall after formation by conditioning the container against a blow mold maintained at a temperature substantially above the Tg temperature. Such a technique is undesirable in that it greatly increases the resident time of the container within the blow mold and generally requires a capital intensive two-mold system.

The process, which is the subject of this invention, does not attempt to thermally condition the container during blow molding, but rather the process optimizes strain induced crystallization during the preform reheating and the stretch blow molding process while minimizing the development of molecular orientation in excess of that required to induce optimum strain crystallization.

The invention particularly relates to a hybrid reheating of the PET preform to a higher than heretofore possible temperature without undue surface crystallization by utilizing radio frequency reheating and the rapid blow molding of the reheated preform after such rapid reheating.

More particularly, the invention relates to the normal reheating of a preform utilizing conventional quartz infrared heating followed by rapid final radio frequency heating and equilibration during the transfer of the reheated preform into the associated blow mold and the initiation of the molding process.

Hybrid reheating of PET preforms is known in U.S. Pat. No. 4,407,651 granted Oct. 4, 1983. In accordance with the teaching of that patent, radio frequency reheating was utilized in conjuction with quartz reheating for the purpose of obtaining a balanced temperature relationship across the wall of the preform with the inside surface of the preform being heated to a higher temperature than the exterior surface so that the cross sectional temperature of the preform was in accordance with the relative stretching in the hoop direction of the preform in the formation of a container. As stated above, this invention relates to the use of radio frequency heating to rapidly complete the heating of the preform to an average temperature which is above the previously achievable average temperature without there being undue surface crystallization.

With the above and other objects in view that will hereinafter appear, the nature of the invention will be more clearly understood by reference to the following detailed description, the appended claims and the several views illustrated in the accompanying drawings.

FIG. 7 is another graph plotting preform temperatures against time when the preform is reheated in accordance with the invention.

FIG. 8 is a temperature cross section through the wall of a PET preform which is being reheated in accordance with FIG. 7 at the end of a first quartz reheating.

FIG. 9 is another temperature profile through the PET preform at the end of a first equilibration step.

Figure 2:
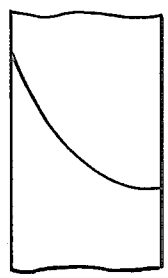
FIG. 2 is a schematic sectional view taken through a portion of the wall of a preform and shows the heat or temperature profile when the preform is heated by a conventional quartz infrared heating system.

It has been found that by maximizing the average preform temperature prior to stretch blow molding, one can reduce the tendency of such blown containers to shrink via two mechanisms. First, higher PET temperatures result in molecular chain slippage during the drawing process, yielding a lower orientation level (i.e., lower orientation levels result in a reduced driving force for shrinkage). Secondly, the increased chain mobility permits more effective strain induced crystallization during the drawing process. The heat shrinkage resistance properties of non-heat set, stretch blow molded PET containers are thus limited by preform temperature prior to stretch blowing. The limit to increased preform temperatures through existing external quartz reheating processes is preform surface crystallization caused by the temperature gradient established through the preform wall with a maximum occurring at the outside surface and a minimum occurring at the interior surface as is shown in FIG. 2. Maximum measured permissible temperatures of reheated PET preforms utilizing quartz infrared reheating range between 240°-250° F. on the outside surface and 180°-190° F. on the inside surface with an average temperature with 200°-210° F.

Figure 3:
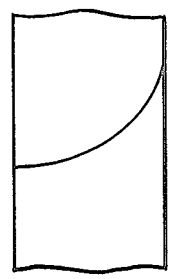
FIG. 3 is a schematic view similar to FIG. 2 and shows the temperature profile through the wall of a preform heated utilizing radio frequency heating means.
Figure 4:
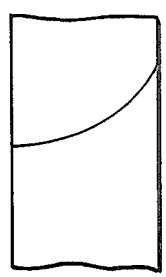
FIG. 4 is another schematic view similar to FIG. 2 and shows the temperature profile through the wall of a preform heated utilizing a combination of the quartz heating of FIG. 2 and the radio frequency heating of FIG. 3.
Figure 5:
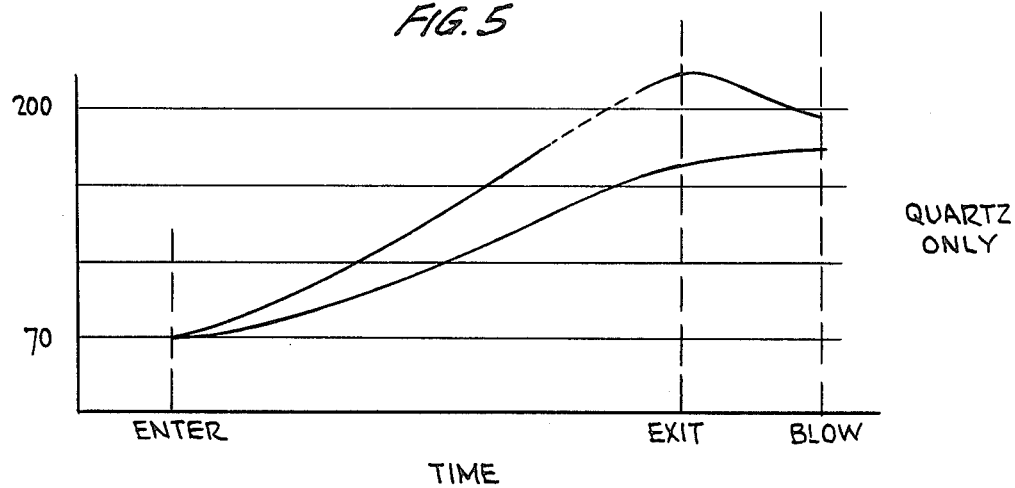
FIG. 5 is a graph showing the temperatures of a preform when being heated utilizing quartz infrared lamps.
Figure 6:
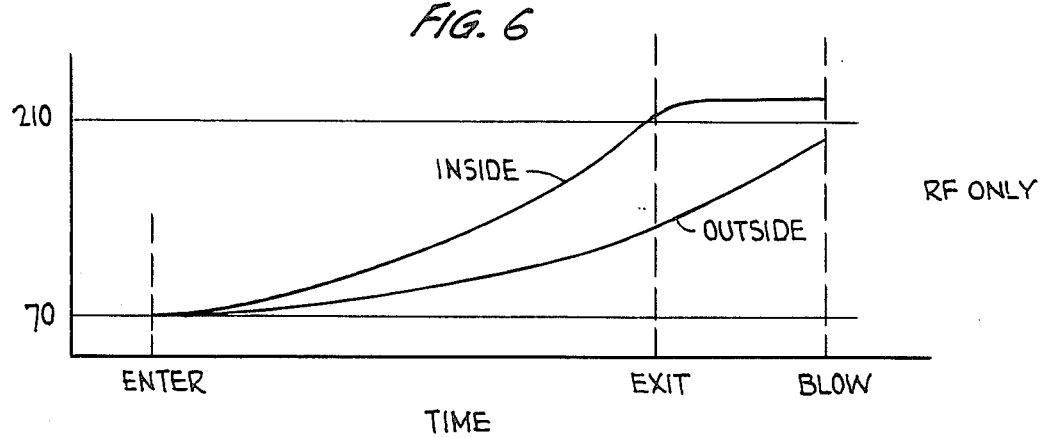
FIG. 6 is a graph similar to FIG. 5 and shows the temperatures of a preform when being reheated utilizing radio frequency energy.

Radio frequency reheating of PET preforms operates on a molecular vibration basis (i.e., internal) as opposed to external radiation to and conduction through the preform as with quartz reheating. As such, a temperature gradient after radio frequency reheating is that shown in FIG. 3.

The use of radio frequency heating alone is limited by excessive internal preform temperatures which would result in inside surface crystallinity (whitening) at average preform temperatures in the 210°-220° F. range.

Containers presently being formed by reheating PET preforms to an average temperature in the range of 200°-210° F. have a shrinkage ranging from 6 to 8%. When the PET preforms are heated by radio frequency alone, with the permissible slightly greater average temperature, there is a certain degree of reduction in the shrinkage.

It has been found that in accordance with this invention, if the average preform temperature is increased to 225° F., shrinkage is reduced to 2% and by increasing the average temperature of the reheated preform at the time of stretch blowing to as high as 260° F., the container shrinkage is reduced to on the order of less than 1%.

While the hybrid reheating disclosed in U.S Pat. No. 4,407,651 does suggest in FIG. 10 two separate quartz oven heatings with the equilibration in between and a further equilibration followed by high frequency heating, the sole purpose of the hybrid reheating was to obtain a substantially uniform temperature throughout the wall of the preform with any temperature difference being in the form of a higher temperature on the inner surface of the preform body as opposed to being on the outer surface. Nothing in that patent in any way suggests that hybrid heating utilizing a combination of quartz oven and radio frequency could be utilized to reheat the preform to a temperature which would normally result in surface crystallization, but in view of the rapid final reheating of the preform, and the relatively quick transfer of the reheated preform to the blow mold and initiation of the blow molding operation, surface crystallization will not occur. This reheating of the preform to this high temperature and the blow molding thereof at the high temperature will result in the ability of the blown container to receive a hot fill with minimum shrinkage, i.e. shrinkage less than 2%.

A typical reheating of a polyester preform in accordance with this invention is identified in FIGS. 1 and 7-12.

Figure 1:
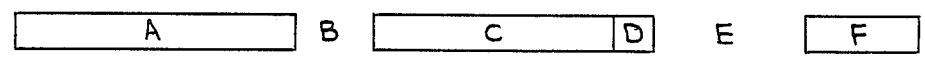
FIG. 1 is a schematic view showing the various steps in the reheating of a PET preform and the stretch blow molding thereof in accordance with the invention.

As will be apparent from FIGS. 1 and 7, in accordance with the invention, the preform is reheated first utilizing a quartz oven or like quartz heater with this first reheating treatment being identified by the letter A. During this quartz reheating, the outside surface temperature rises to a temperature on the order of 240° F. while the inside surface is only slightly heated to a temperature on the order of 120° F. Further, the temperature of the center of the body wall is only slightly greater than the inside surface temperature and is on the order of 140° F.

With respect to FIG. 8, it will be seen that there is illustrated in graph form the temperature of the cross section of the preform body after the initial quartz reheating.

It will also be seen that the initial reheating time is on the order of 14.5 seconds.

After this first quartz reheating, the reheating is discontinued and the preform is premitted to equilibrate for a period of time on the order of 5 seconds. The temperature of the outside surface of the preform body continues to increase to a temperature on the order of 250° F. and then begins to cool down to a temperature on the order of 230° F. At the same time, the temperature of the center of the preform body wall remains generally constant while the temperature of the inside surface of the preform body increases gradually to a temperature on the order of 135° F., the temperature of the inside surface of the preform body approaching that of the center of the preform body. A typical temperature cross section of the partially heated and equilibrated preform body is shown in FIG. 9.

Thereafter, in accordance with this invention, it is preferred that further reheating of the preform be also by way of a quartz heater for a reheating period C. The time of this further quartz reheating is on the order of 12.5 seconds as is clearly shown in FIG. 7. During this period of second quartz reheating, the temperature of the exterior surface of the preform body continues to rise above the temperatures of the center of the preform body and the inside surface of the preform body. The exterior surface temperature rises to on the order of 350° F. while the inside surface temperature slowly gradually rises to a temperature on the order of 180° F. and the temperature at the center of the preform wall slowly rises at a slightly greater rate to a temperature on the order of 220° F.

Thus, after the second quartz reheating, once again the temperature of the exterior surface of the preform body is much greater than that of the interior surface and the temperature at the center of the preform body has also gradually increased above that of the interior surface of the preform body.

Figure 10:
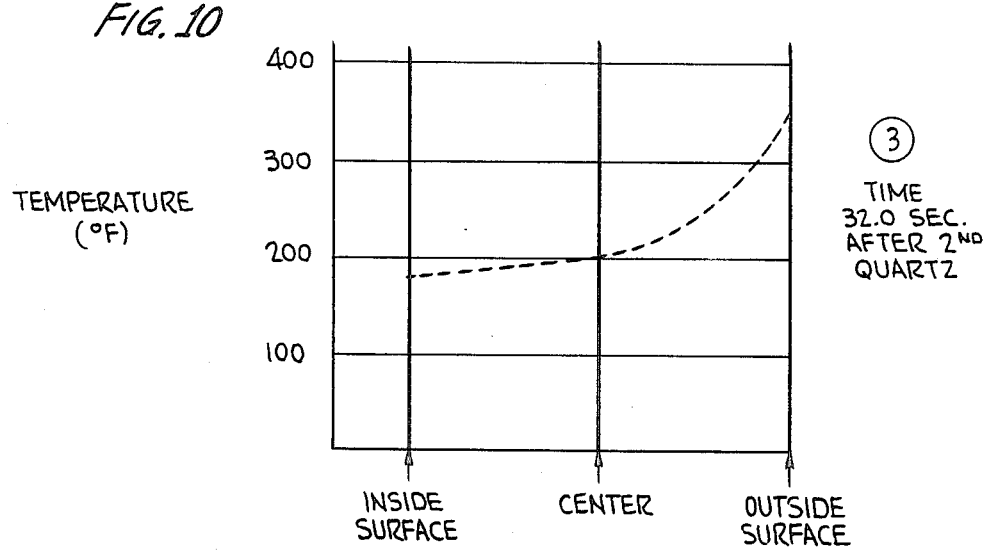
FIG. 10 is another temperature profile through the preform being heated at the end of a second quartz reheating.

When one compares the temperature cross sectional graph of FIG. 10 with that of FIG. 8, it will be seen that the temperature rise at the center of the preform body and at the exterior surface of the preform body as compared to a starting point temperature of the inside surface of the preform body is at an even greater rate than that of FIG. 8.

It is now time to equalize the temperatures of the cross section of the preform body. Accordingly, the preform body is immediately thereafter further reheated by way of radio frequency heating. This heating stage is identified by the letter D.

Figure 11:
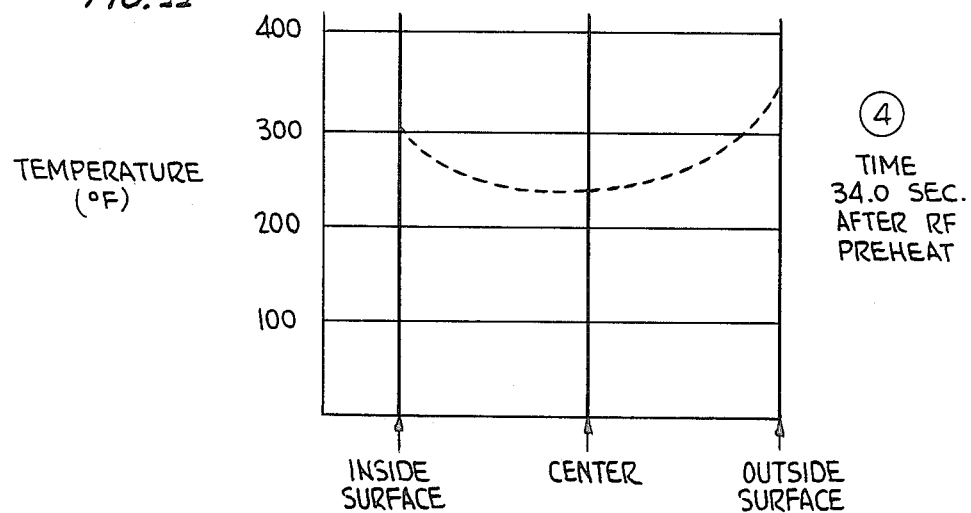
FIG. 11 is another temperature profile through the preform being heated in accordance with FIG. 7 at the end of a supplemental radio frequency heating.
Figure 12:
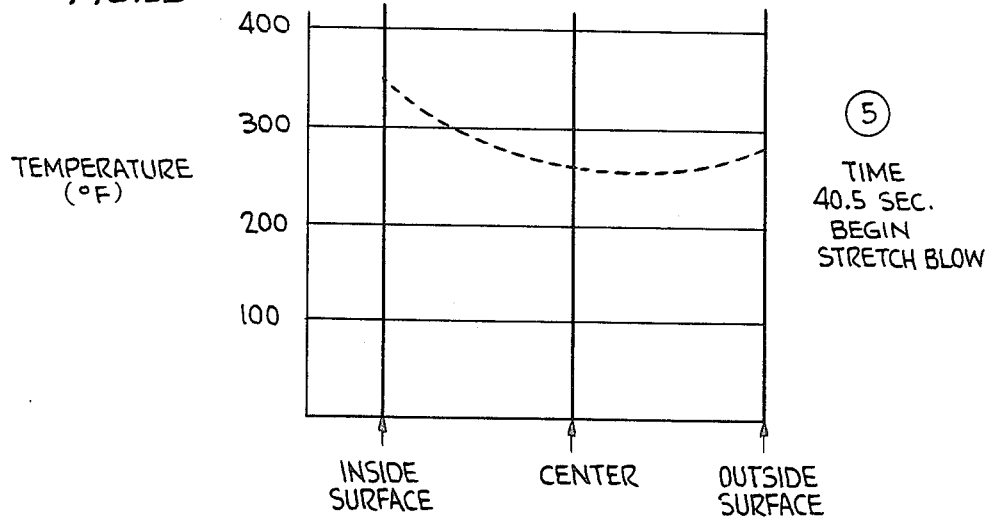
FIG. 12 is a temperature cross section of the preform being heated after a second equilibration which occurs when the heated preform is being transferred to a blow mold and at the time stretch blow molding begins.

As will be seen from FIGS. 7 and 11, while the temperature of the outside surface of the preform body rises only slightly during the heating step D, the heating of the inside surface of the preform body very rapidly increases from the temperature generally on the order of 160° F. to a temperature slightly greater than 300° F. It will be seen that the time for which the preform body was further reheated by way of radio frequency was only 2 seconds. During this time there was only a minor increase in the temperature of the preform body at the center of the cross section thereof to a temperature on the order of 240° F. The temperature cross sectional profile of the preform body at the end of the radio frequency reheating step D is clearly illustrated in FIG. 11 where the temperature of the center of the preform body cross section is the lowest and the temperatures of the inside surface and outside surface are greater.

At this point the application of external heat to the preform is stopped and the preform is directed into a blow mold and blow molding steps are initiated with there being a total lapse of time on the order of 6 seconds. During these 6 seconds there is a second equilibration of the preform with this time sequence step being identified by the letter E.

During the second temperature equilibration, the temperature of the outside surface of the preform body will rapidly decrease to a temperature on the order of, but below 280° F. At the same time, the temperature of the inside surface of the preform body will continue to increase and then taper off at a temperature on the order of 350° F. In a like manner, the temperature of the preform at the center of the body cross section will rise and then taper off at a temperature on the order of 260° F. The temperature cross sectional profile of the preform at the time stretch blowing is initiated is clearly shown in FIG. 12 where it will be seen that the temperature at the center of the cross section of the preform body is still the lowest, but that the temperature of the outside surface is only slightly greater.

Inasmuch as crystallization is a factor of temperature and time and since the time during which surface crystallization may occur after reheating of the preform to its maximum temperature is reduced, the desired high reheat temperature may be obtained in accordance with the reheating method of this application without the undesired surface crystallization.

The relationship of quartz heating to radio frequency heating to equilibration may vary from 10/1/1 at one extreme to 20/1/10 at the other extreme with a preferred ratio of 15/1/3.

In accordance with this invention, it has been found that a center preform temperature of 225° F. utilizing the reheating method described above yields 2% shrinkage. It is possible to obtain a cross sectional center temperature as high as 260° F. without surface crystallization utilizing the reheating steps outlined above and a preform body central temperature on the order of 240°-250° F. will permit the blow stretch molding of polyester containers which may be hot filled with a product at a temperature on the order of 190° F. without any detrimental shrinkage of the polyester from which the container is formed.

Although only a preferred method of reheating a polyester preform has been specifically set forth herein, it is to be understood that minor variations may be made in the reheating process without departing from the spirit and scope of the invention.

I claim:

1. A method of reheating a polyester preform for blow molding, said method comprising the steps of heating said polyester preform in a quartz infrared heater oven to a generally customary temperature for blow molding wherein the temperature of an outside surface of the preform is materially higher than the temperature of an inside surface of a like portion of the preform, transferring the reheated preform to a radio frequency heater and further heating the preform wherein the inside surface of the preform is heated at a greater rate than the outside surface of the preform until the temperature of the inside of the preform at least approaches the temperature of the outside, then transferring the thus heated preform to a blow mold for blow molding with the temperature of both the inside surface and the outside surface of the preform being above the temperature wherein crystallization would occur if the preform were heated to such temperature utilizing either quartz infrared heating or radio frequency heating independently.

2. A method according to claim 1 wherein there is a partial equilibration of outside surface and inside surface temperatures during transfer of the preform to the blow mold.

3. A method according to claim 2 wherein during said heating of the preform utilizing said quartz infrared heater the temperature of the preform inside surface remains below the temperature of the center of the preform, during said radio frequency heating of the preform the temperature of the inside surface of the preform but remains below the temperature of the outside surface of the preform, and during said partial equilibration the temperature of the inside surface of the preform exceeds the temperature of the outside surface of the preform.

4. A method according to claim 3 wherein during said partial equilibration the temperature of the inside surface of the preform continues to increase.

5. A method according to claim 3 wherein during said partial equilibration the temperature of the inside surface of the preform continues to increase while the temperature of the outside surface of the preform decreases.

6. A method according to claim 3 wherein during said partial equilibration the temperature of the center of the preform continues to increase.

7. A method according to claim 3 wherein during said partial equilibration the temperature of the center of the preform continues to increase and approaches the temperature of the outside surface of the preform.

8. A method according to claim 2 wherein said quartz infrared heating is performed in two steps separated by an equilibration step.

9. A method according to claim 2 wherein the ratio of quartz infrared heating time to radio frequency time to equilibration time ranges from 10:1:1 to 20:1:10.

10. A method according to claim 2 wherein the ratio of quartz infrared heating time to radio frequency time to equilibration time is on the order of 15:1:3.

11. A method according to claim 2 wherein said equilibration occurs as the heated preform is being transferred to a molding position.

12. A method according to claim 1 wherein there is a partial equilibration of outside surface and inside surface temperatures during transfer of the preform to the blow mold with the temperature of the center of the preform increasing.

13. A method according to claim 1 wherein there is a partial equilibration of outside surface and inside surface temperatures during transfer of the preform to the blow mold with the temperature of the inside surface continuing to increase.

14. A method according to claim 1 wherein there is a partial equilibration of outside surface and inside surface temperatures during transfer of the preform to the blow mold with both the temperature of the center of the preform and the temperature of the inside of the preform continuing to increase.

15. A method according to claim 1 wherein during said heating of the preform utilizing said quartz infrared heater the temperature of the preform inside surface remains below the temperature of the center of the preform, and during said radio frequency heating of the preform the temperature of the inside surface of the preform rises above the average temperature of the preform.

16. A method according to claim 1 wherein during said heating of the preform utilizing said quartz infrared heater the temperature of the preform inside surface remains below the temperature of the center of the preform, and during said radio frequency heating of the preform the temperature of the inside surface of the preform rises above the average temperature of the preform but remains below the temperature of the outside surface of the preform.

17. A method according to claim 1 wherein the heated preform when presented to a blow mold has an inside surface temperature which is the greatest and a center temperature which is the least.

18. A method according to claim 1 wherein the temperature of the heated preform at the cross sectional center is on the order of 225° to 260° F.

19. A method according to claim 1 wherein the temperature of the heated preform at the cross sectional center is on the order of 225° to 260° F. as compared to a permissible central preform temperature of 200° to 210° F. for quartz heating and 210° to 220° F. for radio frequency heating.

20. A method according to claim 1 wherein said reheating method is particularly adapted for use in reheating a preform which is to be blow molded into a container which has acceptable hot fill performance.

* * * * *